(No Model.)
W. POWELL
DINNER PAIL.
No. 453,659. Patented June 9, 1891.
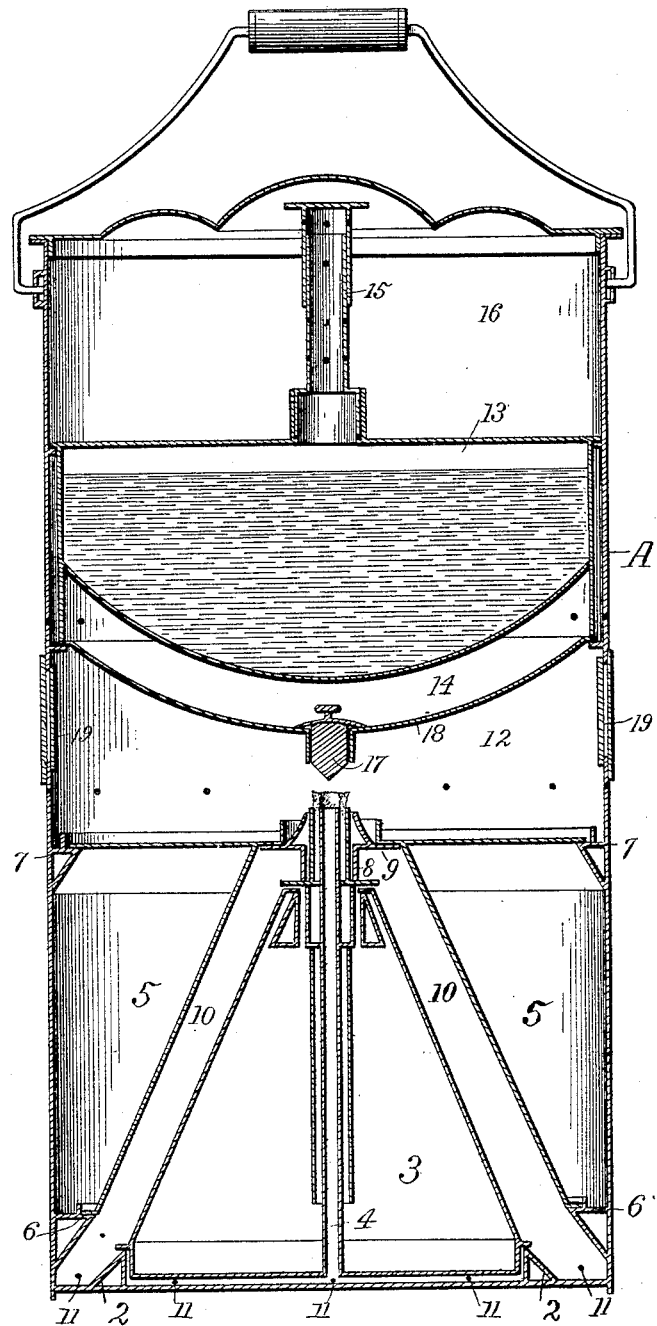
Witness
C. C. Burdine
J. R. Davis
Inventor
William Powell
per R. G. Du Bois
Attorney

UNITED STATES PATENT OFFICE.

WILLIAM POWELL, OF PEN ARGYL, PENNSYLVANIA.

DINNER-PAIL.

SPECIFICATION forming part of Letters Patent No. 453,659, dated June 9, 1891.

Application filed August 2, 1890. Serial No. 360,767. (No model.)

*To all whom it may concern:*

Be it known that I, WILLIAM POWELL, a citizen of the United States, residing at Pen Argyl, in the county of Northampton and State of Pennsylvania, have invented certain new and useful Improvements in Dinner-Pails; and I do hereby declare the following to be a full, clear, and exact description of the invention, such as will enable others skilled in the art to which it appertains to make and use the same.

My invention relates to an improvement in dinner-pails or lunch-heaters; and my object is to produce a compact and serviceable device in which a substantial amount of food and drink can be carried and kept hot and in good condition.

With these ends in view my invention consists in the peculiar features of construction and combinations of parts more fully described hereinafter, and pointed out in the claims.

Referring to the accompanying drawing, the figure represents a central vertical section taken through the complete device.

The outside casing consists of an ordinary round tin pail A, having a suitable handle, and within this pail the lamp and food and liquid receptacles are arranged to removably fit. In the bottom of the pail a circular confining-ring 2 is formed, and the lamp 3 fits within this ring and has the form of a truncated cone, through which extends a central air-tube 4, at the upper end of which is arranged the wick and appurtenances. The space between the lamp and the sides of the pail is utilized for food, which is contained in a circular receptacle 5, which fits at its lower end upon an annular ledge 6, projecting from the inside of the pail near the bottom of the same, and at its upper end upon a similar ledge 7, and also at its inner edge upon the annular flange 9 of a standard 8, mounted on the upper end of the lamp. Between the receptacle 5 and the lamp an air-space 10 is left, and the lower portion of the pail is punctured with holes 11 to admit sufficient air to insure combustion. Above the receptacle 5 and lamp 3 a space or combustion-chamber 12 is made, and here the pail is also punctured to admit air, and above this space is fitted in a can 13, having a double bottom to leave a space 14, this construction being employed to prevent burning of the liquid contained in the can 13, which is adapted to hold the coffee, tea, or other drink. A removable spout 15 is fitted in the top of the can 13 and is perforated to allow the escape of steam, &c., and the space 16 around this spout is arranged to be filled with eatables. In the lower bottom 18 of the can 13 a detachable plug 17 is fitted, which is adapted to direct the flame over the under surface of this bottom. In the sides of the pail surrounding the space 12 may be inserted glasses 19, preferably four in number, which thus render the pail serviceable as a lantern. It will be obvious that when the lamp has been placed in proper position and lighted the receptacles 5 and 13 on opposite sides of the combustion-chamber 12 will be thoroughly heated and their contents kept in proper condition for eating, and it will also be evident that the hot steam escaping from the spout 15 will permeate the victuals filling the space 16 and keep them warm. It will also be seen that when the parts are all fitted in the pail they assume a compact adjustment, and also allow of an adequate supply of food and drink.

It is evident that my arrangement might be slightly varied in many particulars which might suggest themselves; and hence I do not wish to limit myself to the precise construction herein shown, but consider myself entitled to all such slight variations as come within the spirit and scope of my invention.

Having thus described my invention, what I claim as new, and desire to secure by Letters Patent, is—

1. In a dinner-pail, the combination of a lamp, a receptacle surrounding the same, a combustion-chamber above said receptacle, and a removable liquid-containing can fitting snugly in the pail above said chamber and lamp, and a lid separate from the can and fitting on the pail, substantially as described.

2. In a dinner-pail, the combination of a lamp, a removable can fitting above the same, and a perforated removable spout extending from said can and adapted to supply steam to the space around in which food is placed, the top of the can forming an imperforate bottom for said space, as set forth.

3. In a dinner-pail, the combination of a removable lamp, a receptacle surrounding it and arranged to contain food, a combustion-chamber above said receptacle and lamp, a can fitting in the pail above said chamber and being provided with a double bottom, and a perforated removable spout extending from said can and adapted to supply steam to the surrounding space which is arranged to contain food, as set forth.

In testimony whereof I affix my signature in presence of two witnesses.

WILLIAM POWELL.

Witnesses:
DOC DEPUE,
N. D. CHASE.